United States Patent Office 2,947,174
Patented Aug. 2, 1960

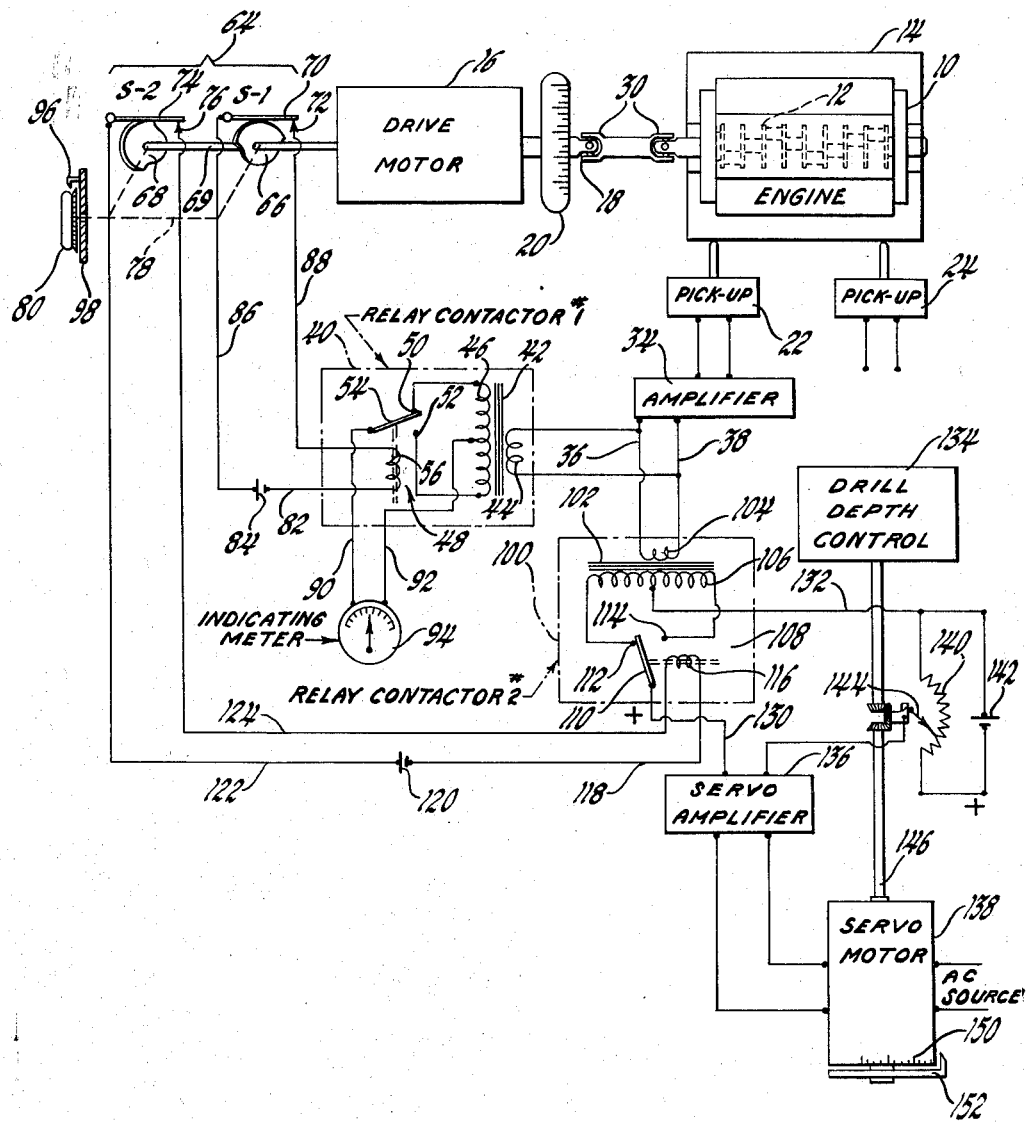

2,947,174

BALANCING ORGANIZATION

Joseph F. Lash, Ferndale, Mich., assignor to General Motors Corporation, Detroit, Mich., a corporation of Delaware Continuation of application Ser. No. 458,172, Sept. 24, 1954. This application Sept. 16, 1957, Ser. No. 684,248

10 Claims. (Cl. 73—464)

This application is a continuation of Serial No. 458,172, filed September 24, 1954, in the name of Joseph F. Lash, now abandoned.

This invention relates to balancing machines of a type particularly adapted for effecting semi-automatic unbalance determinations and balance corrections in elongated rotating workpieces such as crankshafts and the like. The invention is specially suited for use in engine assembly or finish balancing installations in which the crankshaft is checked for unbalance when installed in an engine and any unbalance in the shaft and such unbalance as may be contributed thereto by the other components of the engine associated with the shaft corrected in the assembled condition of the engine.

The invention has among its general objects to provide such apparatus in accordance with the above and which is characterized by extreme simplicity of construction and of operation and, yet, possessed of sufficient sensitivity and a high degree of accuracy and which is adapted to be intimately associated with unbalance correcting apparatus that is automatically adjusted during the determination of the characteristics of unbalance for effecting balance corrections to such devices with a minimum of human intervention.

The above and other objects, together with the features and advantages attending the present invention will appear more fully from the following detailed description and schematic and block diagrammatic showing of a balancing apparatus in accordance with the present invention.

In the drawing, 10 is an engine assembly having a crankshaft shown at 12 therein and mounted with the oil pan cover removed in an oscillatable engine stand or cradle 14. The workpiece may be driven by an electric drive motor 16 which is provided for rotating the workpiece during the unbalance determination operation. This motor 16 is preferably of constant speed. The shaft 18 of the motor 16 has an angularly graduated hand wheel 20 mounted thereon and is suitably coupled to the engine crankshaft 12 to rotate the latter on its axis in the cradle or stand. Vibration pickups 22 and 24 are provided at each end of the workpiece to be responsive to the vibrations created by any unbalance therein and generate signals indicative of the unbalance. Each of the pickups is associated with an unbalance magnitude and location determining apparatus and an element of an unbalance magnitude correcting device in accordance with the present invention. Only the set of the unbalance determining apparatus and the element of an unbalance magnitude correcting device for pickup 22 is shown in the drawing. This is for the most part of a diagrammatic nature to bring out principles of operation rather than particular details of construction.

The engine stand or cradle 14 is of a type employed in conventional balancing installations and is mounted on resilient or oscillatable supports that permit movement of the cradle and engine due to unbalance effects in either end of the crankshaft in an axial plane of the shaft and the vibration pickups. In accordance with conventional balancing practice, the crankshaft is coupled to the shaft 18 of the drive motor through a suitable coupling arrangement shown at 30, which may comprise a pair of spaced universal joints that permit free oscillation of the shaft under the influence of unbalance forces therein.

The vibration pickups 22 and 24 are mounted transversely to the axis of the shaft and at spaced points along the length of the cradle corresponding to the mechanical nodal points of the unbalance forces at the respective ends of the crankshaft in accordance with the theory and practice set out in United States Patent 2,293,371 in the name of T. C. Van Degrift assigned to the present assignee. The pickups are conventional electro-magnetic devices each of which generates an alternating current signal proportional to the velocity of the oscillatory vibrations appearing at the respective ones of the aforementioned nodal points, and, by reason of the nodal point mounting thereof, are unaffected by the unbalance influence of the opposite end of the shaft. The alternating current signal from each of the pickup devices has a frequency equal to the rotational speed at which the crankshaft is driven and an amplitude proportional to the total unbalance effect produced by the end of the shaft adjacent the pickup. Each pickup signal further includes a phase displacement characteristic that is related to the angular location of the total unbalance from a fixed point, which is on the surface of the shaft, and may be contained in a transaxial correction plane extending through an end counterweight of the shaft, there being two such correction planes for the shaft.

Pickup 22, together with the apparatus associated therewith, is adapted, therefore, to sense the characteristics of unbalance at the left end of the shaft and has its output amplified in an amplifier 34, the output of which is applied over conductors 36, 38 to a first chopper device 40. Although there are numerous circuits which may be employed, the present chopper device 40 includes a transformer 42 having a primary winding 44 connected to conductors 36, 38 and a center tapped secondary winding 46 associated with a relay contactor 48 having a pair of stationary contacts 50, 52 and a movable switch arm 54 operable between said contacts by an energizable relay coil 56.

Relay coil 56 is connected for energization in a circuit which is periodically actuated in response to the rotation of the workpiece. The actuation of the relay is preferably by means of a square wave of 180° duration and having a known phase relation to the workpiece. Although there are numerous generators 64 for creating such a wave, in the present instance it is accomplished by a mechanical make and break switch S–1 actuated by a cam 66 rotating with the drive motor shaft. The square wave generator 64 also includes a second S–2 which is actuated by a second cam 68 similar to the first but oriented 90° therefrom. Each cam has associated therewith a pair of circuit contacts 70, 72, and 74, 76, which are stationary and are alternately closed and opened for each revolution of the shaft 69. This will generate a pair of 180° square waves, 90° out of phase with each other. Suitable ganged means 78 associated with the cams and including a control knob 80 is provided for angularly displacing the cams relative to their contacts to alter the commencement of the half period during which the contacts 70, 72 and 74, 76 are closed and opened relative to a fixed reference point on the crankshaft.

The energizing circuit for relay coil 56 includes conductor 82, a source of power such as battery 84, conductor 86, contacts 70, 72 and conductor 88. The movable switch arm 54 of the relay 48 thus is alternately moved between its contacts 50, 52 to provide a reversing or commutating action of the amplified pickup signal. This commutated signal appears in the output of the chopper device 40 between conductors 90 and 92, which are connected to switch arm 54 and the center tap of the transformer secondary winding, respectively, and may be displayed on a zero center D.C. milliammeter 94 connected between conductors 90 and 92. Rotation of the control knob 80 by the operator to adjust the position of the cams 66 and 68 with respect to the crankshaft will cause the amplitude of the full wave rectified signal displayed on meter 94 to vary from zero to maximum. The control knob 80 is provided with angular graduations thereon so that its angular displacement relative to a reference pointer 96 on a stationary panel or the frame 98 of the contact mechanism 64 may be read for a zero or null reading of meter 94 as an indication of the angular location of the unbalance in, say, the left end of the crankshaft.

The amplitude or magnitude of the total unbalance at the left end of the shaft is determined by applying the amplified pickup signal appearing at the output of amplifier 34 to a second chopper device 100 which may be similar to chopper 40. This chopper 100 also includes a transformer 102 having a primary winding 104 and a center tapped secondary winding 106 and a relay contactor 108 with a switch arm 110 movable between a pair of stationary contacts 112 and 114 by an energizable actuating coil 116. Actuating coil 116 is connected in an energizable circuit which includes conductor 118, battery 120, conductor 122, contactor 74 and 76 of contact mechanism 64 and conductor 124.

The commutated output of the second chopper 100 is taken from the center tapped secondary winding 106 and switch arm 110 and applied as a full wave rectified signal over conductors 130, 132 to a closed loop servo controlled amplitude comparison circuit which automatically indicates the magnitude of the unbalance quantity and positions an adjustable drill stop setting element 134 of a balance correction drilling organization associated with the unbalance determining apparatus to effect exact compensation for the amount of the unbalance at the left end of the shaft. The amplitude comparison and drill stop positioning apparatus includes a conventional servo amplifier 136 and its associated two-phase servo motor 138 and a potentiometer arrangement comprising the adjustable resistor 140 connected across a fixed, known reference source of balance voltage, shown as battery 142. The output of the second chopper 100 is connected in series with the input of the servo amplifier and the portion of the output of the potentiometer appearing between conductor 132 and the adjustable arm 144 of the potentiometer resistor 140, which is mechanically coupled to the shaft 146 of the servo motor 138.

One of the phase windings of the servo motor 138 is connected for energization from a local alternating current source of supply and the other quadrature phase winding thereof connected for energization by a control signal which appears at the output of the servo amplifier and corresponds to the amplitude difference between the output of the chopper and the potentiometer. The resulting differential control signal is of such magnitude and polarity as to tend to rotate the servo motor in a direction and an amount such as to reduce the error or control signal to zero at which point the comparison system will be balanced and the motor or translating device will cease moving.

An indicating arrangement in the form of a graduated indicator dial 150, which may be provided on, say, the stator casing of the servo motor 138, and a pointer 152 carried by the shaft 146 may be employed to indicate the magnitude of the unbalance. In accordance with the invention the shaft 146 of the servo motor 138 is directly coupled to the drill depth control element 134 of a balance correcting drilling organization or equivalent balance correcting apparatus, which is mounted under the engine assembly, and adjusts the drill depth setting element automatically in accordance with the determination of unbalance.

The two cams 66 and 68 of the contact mechanism 64 both move as the operator adjusts the control knob 80 for zero or null reading on the D.C. meter 94. The output of chopper 40, which is associated with the unbalance location or angle determining portion of the apparatus, is then zero while that of chopper 100, which is associated with the quadrature related cam 68 of the unbalance magnitude determining portion of the apparatus, will be a maximum. After the angular location of the unbalance has been read by the operator from the control knob 80 and the drill depth stop element 134 has been automatically adjusted by the servo motor of the self-balancing amplitude comparison circuit, the drive motor is stopped, the operator manually adjusts the hand wheel 20 to position the exposed counterweight of the crankshaft where one of the balance corrections is to be performed over the drill bit of the drilling organization mounted below the engine stand and thereafter energizes the drill motor and transmission apparatus thereof to remove an amount of metal corresponding to the setting of the automatically adjusted drill depth setting element from the counterweight in the left end correction plane. The operation is repeated for the right end of the shaft.

The use of the chopper integrating apparatus for the unbalance magnitude determining portion of the unbalance computing apparatus assures that the unbalance signal obtained from the output of the chopper will be unaffected by and will be independent of all frequencies other than the fundamental frequency determined by the speed of spindle 69. In short, the chopper acts as a very narrow band pass filter.

Pickup 24 is adapted to sense unbalance effects in the right end of the crankshaft and will have its output applied to an unbalance determining and drill depth control apparatus including a second contact mechanism and a second set of angle location and unbalance magnitude choppers and associated apparatus identical with that associated with pickup 22, the complete illustration of which has been omitted for simplicity of the drawing.

What is claimed is:

1. Apparatus for determining the magnitude and angular location of unbalance of a dynamically unbalanced body comprising in combination, means supporting the body for rotation about its axis; drive means rotating the body on its axis; vibration pickup means responsive to vibrations induced by unbalance in said body and developing a periodically varying signal having characteristics related to the magnitude and the location of unbalance in said body; a pair of commutating chopper devices each having a transformer with a primary winding connected to said vibration pickup means and a center-tapped secondary winding, a relay having a pair of stationary contacts connected to the opposite ends of said secondary winding and an armature movable between said contacts by an operating coil of the relay, a variable contact mechanism including a pair of cams displaced 90 degrees apart and driven by said drive means in synchronism with said body, a pair of switches each having a pair of switch contacts and adapted to be actuated by a different one of said cams, and adjustable means for changing the position in space of said switches relative to said cams, the said switch contacts of each of said cam operated switches being connected in separate energizing circuits for the relay operating coil of a different one of said chopper devices; a null indicating device connected to the output of one of said chopper devices constituted by the relay armature and center tap of the transformer secondary winding associated with said one chopper device; and a self-balancing type of amplitude comparison circuit connected to the output of the other of said chopper devices.

2. The combination in accordance with claim 1 wherein said self-balancing type amplitude comparison circuit includes an adjustable known source of balancing potential and a servo motor, which is actuated by the difference signal between the commutated output of one of said chopper devices and said adjustable known source of balancing potential and is operatively connected to adjust the latter to reduce the said difference signal to zero.

3. The combination in accordance with claim 2 which includes an adjustable stop element positioned by said servo motor in accordance with the magnitude of unbalance in said body determined in the course of balancing said self-balancing amplitude comparison circuit.

4. In apparatus for determining the magnitude of unbalance of a dynamically unbalanced body including means supporting the body for rotation about its axis, drive means coupled to said body for rotating the latter on its axis, and vibration pickup means responsive to vibrations induced by unbalance in said body and developing a periodically varying signal having characteristics related to the magnitude of unbalance in said body; the combination of unbalance magnitude determining means including a commutating chopper device having a transformer with a primary winding connected to said vibration pickup means and a center-tapped secondary winding, a relay having a pair of stationary contacts connected to the opposite ends of said secondary winding and an armature movable between said contacts by an operating coil of the relay, a variable contact mechanism including a cam driven by said drive means in synchronism with said body and a pair of switch contacts adapted to be actuated by said cam, and adjustable means for changing position in space of said switch contacts relative to said cam, said switch contacts being connected in an energizing circuit for said relay operating coil; and utilizing means connected to the output of said chopper device constituted by the relay armature and center tap of the transformer secondary winding and indicating the magnitude of unbalance in said body.

5. Apparatus for determining the location of unbalance of a dynamically unbalanced body comprising in combination, means supporting the body for rotation about its axis; drive means including a rotatable shaft coupled to said body for rotating the latter on its axis; vibration pickup means responsive to vibrations induced by unbalance in said body and developing a periodically varying signal having characteristics related to the location of unbalance in said body; unbalance angle determining means including a commutating chopper device having a transformer with a primary winding connected to said vibration pickup means and a center-tapped secondary winding, a relay having a pair of stationary contacts connected to the opposite ends of said secondary winding and an armature movable between said contacts by an operating coil of the relay, a variable contact mechanism including a cam driven by said drive means in synchronism with said body, a pair of switch contacts adapted to be actuated by said cam, and adjustable means for changing position in space of said switch contacts relative to said cam, said switch contacts being connected in an energizing circuit for said relay operating coil; and a null indicating device connected to the output of said chopper device constituted by the relay armature and center-tap of the transformer secondary winding.

6. In apparatus for determining the magnitude of unbalance of a dynamically unbalanced body including means supporting the body for rotation about its axis, drive means coupled to said body for rotating the latter on its axis, and vibration pickup means responsive to vibrations induced by unbalance in said body and developing a periodically varying signal having characteristics related to the magnitude of unbalance in said body; the combination of unbalance magnitude determining means including a commutating chopper device having a transformer with a primary winding connected to said vibration pickup means and a center-tapped secondary winding, a relay having a pair of stationary contacts connected to the opposite ends of said secondary winding and an armature movable between said contacts by an operating coil of the relay, a variable contact mechanism including a cam driven by said drive means in synchronism with said body and a pair of switch contacts adapted to be actuated by said cam, and adjustable means for changing position in space of said switch contacts relative to said cam, said switch contacts being connected in an energizing circuit for said relay operating coil; and a self-balancing type amplitude comparison circuit connected to the output of said chopper device.

7. The combination in accordance with claim 6 wherein said self-balancing type amplitude comparison circuit includes an adjustable known source of balancing potential and a servo motor, which is actuated by a signal proportional to the difference signal between the commutated output of said chopper device and said adjustable known source of balancing potential and is operatively connected to adjust the latter to reduce the said difference signal to zero.

8. The combination in accordance with claim 7 which includes an adjustable stop element of an unbalance correction apparatus positioned by said servo motor in accordance with the magnitude of unbalance determined in the course of balancing said self-balancing amplitude comparison circuit and transmission means between said servo motor and said adjustable stop element for positioning the latter to control the extent of unbalance correction to be performed on said body subsequent to the unbalance determination thereof.

9. In apparatus for checking the existence of dynamic unbalance in the crankshaft and the components associated therewith of an assembled engine and determining the magnitude of any dynamic unbalance therein, the combination of a vibratile cradle mounting the assembled engine therein; a motor coupled to the crankshaft and rotating the crankshaft about its axis in said engine; a vibration pickup responsive to the vibrations of said cradle induced by unbalance of said crankshaft and associated engine components and mounted at a vibration nodal point of said cradle, said pickup developing a periodically varying electrical signal related to the magnitude of dynamic unbalance in said engine; unbalance magnitude determining means including a commutating chopper device having a transformer with a primary winding connected to said vibration pickup means and a center-tapped secondary winding; a relay having a pair of stationary contacts connected to the opposite ends of said secondary winding and an armature movable between said contacts by an operating coil of the relay, a variable contact mechanism including a cam driven by said drive means in synchronism with said body and a pair of switch contacts adapted to be actuated by said cam, and adjustable means for changing position in space of said switch contacts relative to said cam, said switch contacts being connected in an energizing circuit for said relay operating coil; and utilizing means connected to the output of said chopper device constituted by the relay armature and center tap of the transformer secondary winding and indicating the magnitude of unbalance in said body.

10. Unbalance measuring apparatus for measuring the unbalance in a rotating workpiece comprising, circuit means having a pair of separate portions, each of said portions having a first inductive input and a second inductive input, at least one of said inputs in each of said portions comprising the primary of a transformer, a vibration pickup for creating an unbalance signal indicative of the unbalance in said workpiece and interconnected with the pair of said first inputs, each of said portions having a secondary winding inductively coupled to said primary windings, said secondary windings each having a center tap and a pair of end taps, each of said portions having commutating means for alternatively connecting said end taps to a first lead, said center taps each connected to a second lead, said first of second leads of each portion forming an output for each of said portions, reference means actuated in response to the rotation of said workpiece to generate a pair of electrical reference signals ninety degrees out of phase with each other and having a known phase relation relative to the angular position of said workpiece, said reference means being interconnected with said commutating means for energizing said commutating means to cause the same to demodulate the unbalance signal from said inputs and produce a pair of output signals in said outputs, means for adjusting said reference means to vary the phase relation of said reference signals relative to said workpiece so that the signal in said second pair of inputs can be varied until one of said output signals is a minimum and means for observing the other of said output signals.

References Cited in the file of this patent

UNITED STATES PATENTS

| | | |
|---|---|---|
| 2,243,379 | Johnson | May 27, 1941 |
| 2,451,863 | Oakley | Oct. 19, 1948 |
| 2,636,381 | Hagg et al. | Apr. 28, 1948 |
| 2,731,835 | Hellar et al. | Jan. 24, 1956 |